April 5, 1966  C. F. GRAHAM  3,244,238
PLOWSHARES
Filed April 6, 1964

INVENTOR.
CHARLES F. GRAHAM
BY Roy A. Plant
ATTORNEY

United States Patent Office 3,244,238
Patented Apr. 5, 1966

3,244,238
PLOWSHARES
Charles Frederick Graham, 40th St., R.R. 1,
Paw Paw, Mich.
Filed Apr. 6, 1964, Ser. No. 357,470
2 Claims. (Cl. 172—761)

The present invention relates broadly to plowing equipment, and in its specific phase to an improved plowshare.

This application is a continuation-in-part of my copending application, Ser. No. 264,458, filed March 11, 1963, and which is being abandoned in favor of this application.

The plow art is one which extends back into antiquity where hook ended sticks were pulled by oxen, camels, horses, and even people to scratch the land surface to improve planting conditions, and in some backward areas this procedure is still followed. More recently plows having a steel landside, moldboard, and plowshare or plow point have been developed, first for draft animal pulling of a single plow, and now almost exclusively by tractors pulling gang plows. Curently plowshares universally have a straight elongated bottom edge which operates very satisfactorily in light to moderately heavy soils when they are adequately moist as found at normal plowing times. New land, stony land, rooty land, and hard dry heavy land particularly, on the other hand, is difficult to plow, rapidly wears out the plowshare, and many times cannot be plowed due to the plow being forced out of the ground under plowing conditions.

In an effort to overcome some of these difficulties it has been proposed to have the point or front end of the plowshare extend forward and somewhat below the longitudinal bottom edge of the plowshare. Other designs have involved placing a wavy or a sawtooth edge, and even widely spaced narrow flat bottomed teeth on the longitudinal bottom edge of the plowshare. These procedures utilizing such forms of plowshare bottom edges have not been wholly satisfactory since in some instances they merely scarified rather than sheared the bottom of the furrow and at other times formed a camming or sleigh runner effect which tended to force the plow out of the ground, particularly where it was either stony or in the form of hard dry heavy ground, and which was further aggravated when there were brush roots in such ground. It was a recognition of these problems and the lack of any wholly satisfactory solution to same which led to the conception and development of the present invention.

Accordingly, among the objects of the present invention is the provision of an improved plowshare which, in difficult-to-plow ground, operates better than the universally used straight bottom edge plowshares.

Another object of my invention is to design a plowshare that will penetrate, and hold a plow to constant cutting depths in very hard or dry soil as well as moist soil and will do so for a longer length of time without requiring sharpening or replacement.

Another object is the design of an inexpensive plowshare, simple in construction, in which the cutting portions have a certain shape as hereinafter described.

Another object is to provide a plowshare having a breaking action which causes less draft than a plowshare having a single straight bottom edge and one point, and which leaves the plowed soil less compacted so as to permit better capillary action in the soil.

Another object is to provide an improved plowshare attachable to a plow in accordance with common practice, and which will withstand hazardous plowing conditions such as gravel and/or stony ground equally as well as the conventional plowshares now in common use.

A further object of this invention is to provide an improved plowshare having special shaped notches in the bottom edge of same with those notches inclined backward, sharpened on their top and forward edges, the bottom rear edge of said notches sloped to substantially match the downward and rearwardly extending slope of the point of said plowshare, and with relatively wide bottom edge portions of said plowshare between notches to give plowing stability and long wear capability.

Still further objects and advantages of this invention will appear as the description proceeds.

To the accomplishment of the foregoing and related ends, the invention, then, consists of the improved plowshare hereinafter fully described and particularly pointed out in the claims, the annexed drawing and the following description setting forth in detail certain means for carrying out the invention, such disclosed means illustrating, however, but one of various ways in which the principle of the invention may be used.

Figure 1:
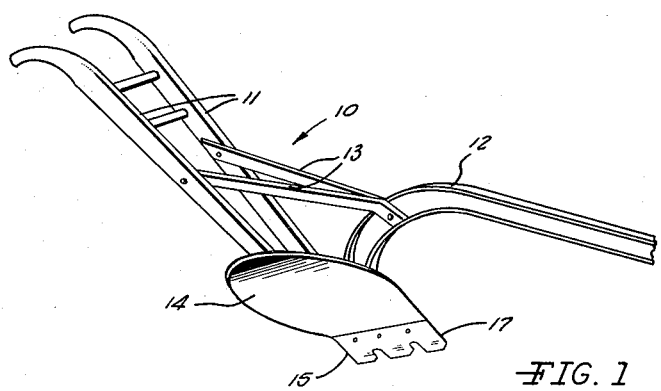
FIGURE 1 is a fragmentary perspective view of a conventional hand guided walking plow utilizing my improved plowshare attached to the plow bottom or moldboard, and comprising multiple points.

Referring more particularly to FIGURE 1, it will be noted that there has been shown a conventional walking plow 10 incorporating the present invention although the latter is equally well adapted for use with sulky plows, gang plows, and the like. This walking plow 10 has handles 11, a beam 12, brace members 13 joining the handles to said beam, a moldboard 14 having the improved plowshare 15 at its lower edge, a landside (not shown) on the opposite side of said plow from said moldboard and extending to the leading end of said plowshare, and a frog (not shown) behind said moldboard to which said handles, beam, moldboard and landside are joined in conventional manner. Quite commonly a coulter or jointer may be used to cut the ground in front of the moldboard and in line with the landside, and there may also be a gauge wheel to control the plowing depth with all of these members mounted on the beam, but same have not been illustrated since they are not part of the present invention which resides in the plowshare 15.

The plowshare is conventionally bolted to the bottom of the moldboard 14, or to the frog (not shown) on which the moldboard is fastened, and this bolting can be by conventional flat headed bolts 16 which can be either removable or welded to the body portion 25 of plowshare 15, and it is intended that the drawing be considered to diagrammatically show both of these constructions. It is to be noted that when the plowshare is bolted to the lower edge of the frog or moldboard, with nuts (not shown) on the inner side of same, the plowshare and moldboard form a substantially continuous outer surface over which the ground being plowed moves as same is turned over by the plow. The leading end 17 of the plowshare 15 preferably has a point 18 inclined at a backward angle to the direction of travel of the plow under plowing operation. On the other hand the heel 19 of the plowshare may, if desired, be substantially parallel to the leading end of same so as to fit the bottom portion of the moldboard 14 as shown in FIGURE 1.

Figure 2:
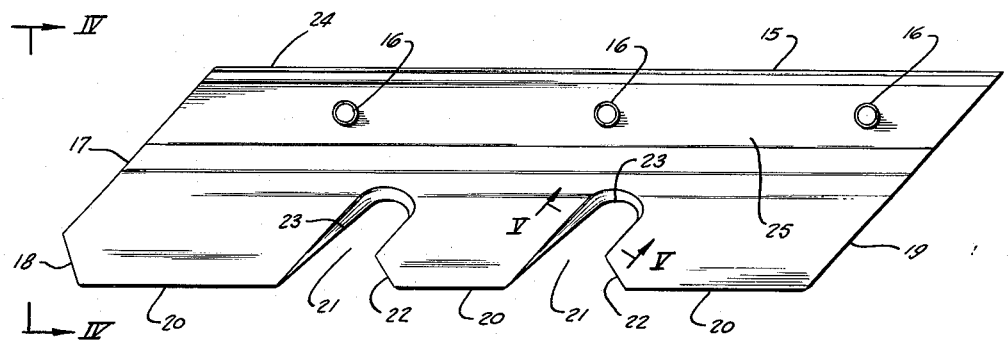
FIGURE 2 shows an enlarged side view of the plowshare of the present invention but as seen from the opposite side to that illustrated in FIGURE 1.
Figure 3:
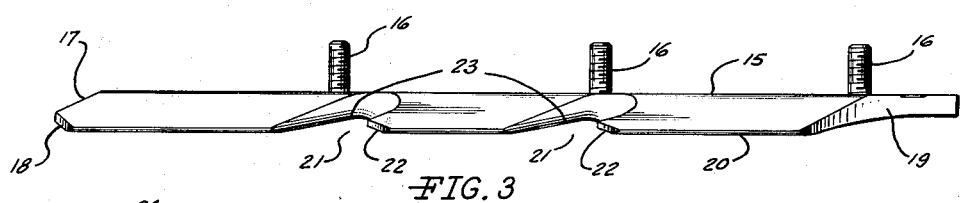
FIGURE 3 is a bottom view of the plowshare as seen along line III—III of FIGURE 4, looking in the direction of the arrows.
Figure 4:
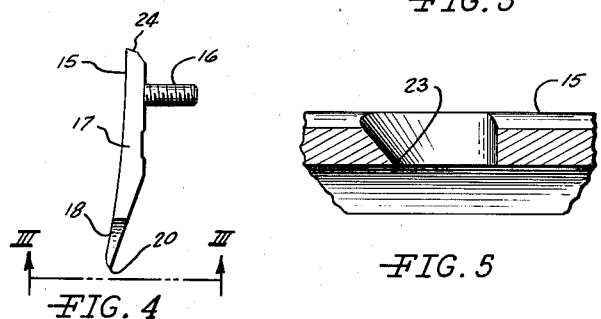
FIGURE 4 is an end view of the plowshare as seen along line IV—IV of FIGURE 2, looking in the direction of the arrows.

Now referring to FIGURES 2, 3 and 4, it will be noted that the outer face of the plowshare 15 is moderately curved in its vertical section so as to provide a slightly hollow outer face for cooperating with the curvature of the moldboard as previously described. The lower edge 20 of the plowshare is beveled or substantially sharpened as shown to aid in cutting the ground at the bottom of the furrow under plowing operation.

Figure 5:
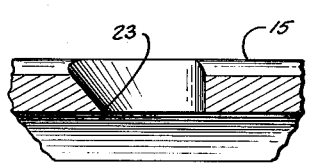
FIGURE 5 is an enlarged fragmentary sectional view as taken along line V—V of FIGURE 2, looking in the direction of the arrows.

The bottom or lower edge 20 of the plowshare 15 is also provided with notches 21 which are preferably inclined backward in the range of 30° to 60° from the bottom of said plowshare to match the slope of the leading end 17 of the plowshare, and with the lower portion 22 of the trailing edge of these notches 21 preferably being tapered backward substantially parallel to the point 18 so as to provide similar multiple cutting edges. The forward and top edges 23 of notches 21 are preferably beveled or sharpened as shown in FIGURES 2 and 5 to cut roots or the like and prevent clogging when they are encountered under plowing conditions.

Lower edge 20 of the plowshare, which is broken by notches 21, is proportioned so that the openings made by the bottom of said notches are equal to and preferably less than the length of the adjacent unbroken portions of said lower edge on opposite sides of and between said notches. This produces broad and stable lower cutting edge portions 20 of the plowshare which facilitates plowing to constant cutting depths in very hard or dry soil, which is difficult to plow, and even where the ground is moderately stony.

In preferred construction the distance from the lower edge 20 of the plowshare to the top of notches 21 is normally less than half the distance from the lower edge 20 to the top edge 24 of the plowshare, although with a new plowshare 15 the distance from the lower edge 20 to the top of notches 21 may be, if desired, approximately one half of the distance from the lower edge to the top edge of the plowshare.

A plowshare which has proved in use to be exceptionally good for plowing heavy, dry, hard ground which was almost impossible to plow with a conventional straight bottom plowshare, was four and one-quarter inches wide from top to bottom and had two notches which extended one and three-quarter inches toward the top of the plowshare, as shown in FIGURE 2, with the parallel notch sides being at an angle of 45° to the bottom of the plowshare and spaced approximately three-fourths of an inch apart. The full width of notches 21 at the horizontal bottom of the plowshare was approximately two and one-half inches, while the three lower edge portions 20 were each approximately three and one-half inches long. Thus approximately two-thirds of the bottom of the plowshare contacts the bottom of the furrow while the two cutting edges 22, which are approximately three-quarters of an inch long when the plowshare is new, supplement the point 18 in cutting and breaking the ground as the plow moves forward with the plowshare at an outturned angle to the direction of movement of the plow and which determines the width of the furrow. The sharpened edges 23 of notches 21 act to cut small roots forced into the notches under plowing operation, thus further facilitating the plowing of difficult-to-plow land.

Other modes of applying the principle of my invention may be employed instead of the one explained, change being made as regards the plowshare herein disclosed, provided the means stated by any of the following claims or the equivalent of such stated means be employed.

I therefore particularly point out and distinctly claim as my invention:

1. A plowshare having a body portion which is substantially in the shape of a parallelogram with means adjacent its upper edge portion for mounting same on a plow, the lower edge portion of said plowshare having two backwardly inclined notches between its leading and heel ends, said notches extending from the outer to the inner faces of said plowshare, said angle of incliniation of said notches being substantially the same and in the range of 30° to 60° to the lower edge portion of said plowshare, with the lower edge of said plowshare extending from the point to the heel portion thereof and carrying said notches being substantially in a straight line between and at opposite sides of said notches and constituting a major part of the length of said notched lower portion, a minor portion of said plowshare at the junction of its leading end and bottom portion tapering downward and backward, and a minor lower portion of the trailing wall of each of said notches likewise tapering downward and backward thus providing three like backward tapering points on said plowshare which facilitate plowing with same.

2. A plowshare as set forth in claim 1, wherein said substantially straight line bottom edge portions constitute approximately two-thirds the length of said plowshare bottom, and the leading side edges and top of said notches being sidewise tapered and relatively sharp at the outer face of said plowshare.

References Cited by the Examiner

UNITED STATES PATENTS

| | | | |
|---|---|---|---|
| 506,710 | 10/1893 | Mitchell et al. | 172—756 |
| 881,379 | 3/1908 | Crapo | 172—761 |
| 1,133,211 | 3/1915 | Wright | 172—761 |
| 1,214,882 | 2/1917 | Bessant | 172—555 |
| 1,318,621 | 10/1919 | Vanderwilt | 172—761 |
| 1,522,350 | 1/1925 | Vogel et al. | 172—76 X |

ABRAHAM G. STONE, *Primary Examiner.*

T. GRAHAM CRAVER, ANTONIO F. GUIDA,
*Examiners.*